(12) United States Patent
Dubuis et al.

(10) Patent No.: US 6,464,919 B2
(45) Date of Patent: *Oct. 15, 2002

(54) DEVICE AND METHOD FOR TEMPERATURE ADJUSTMENT OF AN OBJECT

(75) Inventors: David Dubuis, Algrange (FR); Witold Neter, Newman, GA (US)

(73) Assignee: Husky Injection Molding Systems, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/748,298

(22) Filed: Dec. 22, 2000

(65) Prior Publication Data

US 2002/0079620 A1 Jun. 27, 2002

(51) Int. Cl.⁷ .................. B29C 35/16; B29C 45/72; B29C 49/64
(52) U.S. Cl. .................. 264/237; 425/445; 425/526; 425/547
(58) Field of Search .................. 425/526, 547, 425/445; 264/237, 348

(56) References Cited

U.S. PATENT DOCUMENTS

| | | | | |
|---|---|---|---|---|
| 3,940,231 A | * | 2/1976 | Uhlig | 425/445 |
| 4,592,719 A | * | 6/1986 | Bellehache et al. | 34/428 |
| 4,786,455 A | * | 11/1988 | Krishnakumar et al. | 264/237 |
| 5,176,871 A | * | 1/1993 | Fukai | 264/328.14 |
| 5,641,451 A | * | 6/1997 | Orimoto et al. | 264/521 |
| 5,702,734 A | * | 12/1997 | Hartman et al. | 264/237 |
| 5,837,299 A | * | 11/1998 | Bright et al. | 425/526 |
| 6,171,541 B1 | * | 1/2001 | Neter et al. | 264/328.14 |
| 6,223,541 B1 | * | 5/2001 | Farrag | 425/526 |

FOREIGN PATENT DOCUMENTS

EP   0 700 770 A2 * 3/1996

* cited by examiner

Primary Examiner—Robert Davis
(74) Attorney, Agent, or Firm—Katten, Muchin, Zavis, Rosenman

(57) ABSTRACT

A device for temperature adjustment of an object generally comprises means for providing a flow of a conditioning fluid, said flow of conditioning fluid being directed along a surface of said object, and at least one fin directed towards said surface of said object. The at least one fin is arranged in the immediate vicinity of said surface of said object so that an edge of said fin extends substantially normally with respect to said flow of said conditioning fluid, said conditioning fluid passing between said surface of said object and said edge of said fin.

35 Claims, 3 Drawing Sheets

DEVICE AND METHOD FOR TEMPERATURE ADJUSTMENT OF AN OBJECT

The present invention relates to a device and a method for temperature adjustment of an object, especially a device and a method for temperature adjustment of a molded object after removal from a mold cavity of an injection molding machine.

In order to improve the productivity of injection molding equipment, it has been known to reduce the cycle time for molding an object by removing the molded object from the mold cavity while it is still at high temperature. The molded object has thus to be cooled in a subsequent step in order to reduce the temperature of the molded object below its crystallization temperature range.

Two different approaches have been found for removing and subsequently cooling the molded objects.

In conventional molding machines, a carrying plate with water-cooled tubes is positioned between the opened mold parts and the molded objects are transferred into the tubes of said carrying plate. The plate is then removed from between the mold parts so that the following molding cycle can start. During the next molding cycle the outer surface of the molded objects is cooled in the water-cooled tubes of the carrying. Such a device is disclosed in U.S. Pat. No. 4,729,732. In order to also cool the inner surface of hollow objects, a blowing nozzle can be introduced into the hollow object and a cooling fluid may be blown onto the inner surface of said hollow object.

Turret style injection machines comprise a rotatable turret block with a plurality of movable mold halves and a stationary mold half and platen. Each of the movable mold halves includes a set of mold cores adapted for engagement with a set of mold cavities located in stationary mold half and platen. After a set of objects has been formed on the mold cores of the first movable mold halve, the turret block rotates to a second position, in which the second movable mold halve is positioned for engagement with the stationary mold half. The set of objects remains on the mold cores of the first movable mold and is cooled by a cooling fluid, which is blown onto the exterior surface of the object. U.S. Pat. No. 4,449,913 discloses such a rotary injection turret for use in making preforms. The patent teaches a turret block rotatable on a vertical axis, which block uses two of the turret block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where the gate vestige is trimmed and further temperature conditioning is performed.

According to U.S. Pat. No. 4,449,913, the cooling of the performs at the second position is executed by means of a cooling unit comprising a plurality of nozzles for blowing a cooling gas onto the preforms. The nozzles are equal in number to the cores and are positioned in accordance with the arrangement of the cores so that, after alignment of the preforms with the nozzles, air is separately blown on each of the preforms. The nozzles are carried by a manifold to which there is connected a supply line. At the third station, a conditioning mold comprising a plurality of conditioning cavities receives the partially cooled preforms. Each conditioning cavity is oversized as compared to the preform so that conditioning gas (air) may be circulated along the preform.

An embodiment of a conditioning cavity is disclosed in U.S. Pat. No. 3,882,213. This conditioning cavity comprises a cooling tube for receiving a molded object that is to be cooled. The inner diameter of the cooling tube is larger than the outer diameter of the object, so that a flow passage having a generally annular section is formed between the cooling tube and the object. The inner walls of the cooling tube are provided with interior fluid-directing fins in the form of an internal spiral for directing airflow in an axial and peripheral spiral path around the exterior of the object. It follows, that the flow path of a cooling fluid under pressure, which is introduced into the flow passage, will be substantially longer that in cooling tube with straight flow path. Accordingly, the heat exchange between the object and the cooling fluid in this conditioning cavity will be higher than in a cooling tube with smooth inner walls.

Although the cooling tube of U.S. Pat. No. 3,882,213 enhances the heat exchange between the object and the cooling fluid with respect to a smooth cooling tube, it is believed that the cooling rate of this device is still not sufficient. Furthermore, the manufacture of the fluid directing ribs in the form of an internal spiral is considered to be rather expensive.

OBJECT OF THE INVENTION

The object of the present invention is to provide an improved device and method for cooling a molded object.

GENERAL DESCRIPTION OF THE INVENTION

This object is generally achieved by a device for temperature adjustment of an object, comprising means for providing a flow of a conditioning fluid, said flow of conditioning fluid being directed along a surface of said object, and at least one fin directed towards said surface of said object. According to the invention said at least one fin is arranged in the immediate vicinity of said surface of said object so that an edge of said fin extends substantially normally with respect to said flow of said conditioning fluid, said conditioning fluid passing between said surface of said object and said edge of said fin.

Since the fin ends in the immediate vicinity of the surface of the object, the flow of conditioning fluid along the surface of the object is squeezed in the passage between the surface of the object and said fin. This means that the speed of flow increases in this region, so that the flow of conditioning fluid is highly turbulent in this region. It follows that the heat transfer between the conditioning fluid and the surface of the object in the region of the fin is very high.

After passing between the fin and the surface of the object, the conditioning fluid expands and accordingly the flow of conditioning fluid slows down again. This creates further turbulences, so that the heat transfer between the conditioning fluid and the surface of the object is also increased in a region adjacent to the fin.

With the present invention, the creation of a laminar flow of conditioning fluid along the surface of the object, i.e. a flow configuration with reduced heat exchange inside the flow and between different layers of the flow, is effectively prevented. Hence, the heat exchange between the surface of the object and the conditioning fluid is highly increased compared to prior art devices.

It has to be noted that the conditioning fluid can be either a cooling fluid, as e.g. compressed air, for cooling a warm object or a heat carrier for heating the object. The improved conditioning result is present independently from the type of conditioning.

Depending on the embodiment of the invention, the at least one fin may be arranged substantially normal to said surface of said object or be inclined with respect to a normal of said surface of said object.

In a preferred embodiment of the invention, the fin ends in the vicinity of the surface of the object, so that a small gap is formed between the object and the edge of the fin. In this case the fin can be formed of a rigid material. In an alternative embodiment the edge of the fin abuts against said surface of said object if no conditioning fluid passes between said surface of said object and said edge of said fin. In this embodiment, the fin should be formed of an elastic material, so that the flow of conditioning fluid can displace the edge of the fin from the surface of the object. It follows that in this case, the gap between the edge off the fin and the surface of the object, necessary for passing the fluid, is only created by the fluid itself.

A preferred embodiment of a device for temperature adjustment of an object comprises means for providing a flow of a conditioning fluid, said flow of conditioning fluid being directed along a surface of said object, and a plurality of fins arranged one behind the other in the direction of said flow of said conditioning fluid, said fins being directed towards said surface of said object. In this embodiment, a plurality of narrow passages for the conditioning fluid are formed along the flow direction, each of said passages being delimited by one of the fins and the surface of the object. Furthermore, a several turbulence chambers are formed between the fins. Accordingly, on its way along the surface, the conditioning fluid passes subsequently through the different delimited passages and turbulence chambers, thereby undergoing a plurality of alternate flow speed variations as described above. In this way, the improved cooling effect applies to a greater surface of the object.

The conditioning effect is improved in the zone corresponding to the high speed of the conditioning fluid. Thus, by increasing the number of fins and by placing the fins closer together, the conditioning effect can be increased so that the average conditioning effect is increased.

A further aspect of the present invention relates to a method for temperature adjustment of an object. This method comprises the steps of arranging at least one fin in the immediate vicinity of a surface of said object, said fin being directed towards said surface, providing a flow of a conditioning fluid along said surface of said object, said flow of conditioning fluid being directed substantially normally with respect of an edge of said fin, and passing said flow of conditioning fluid between said surface of said object and said edge of said fin. In a preferred embodiment of the method, the fins are arranged one behind the other in the direction of said flow of said conditioning fluid.

As stated above, the present invention relates also to a device for temperature adjustment of a molded object after removal from a mold cavity of an injection-molding machine. The principle of the invention can e.g. be used in the production of molded articles in a turret type molding machine, in which the molded objects remain on the mold cores of a mold half. For this application, a device for temperature adjustment of an object preferably comprises a conditioning tube and an associated means for providing a flow of a conditioning-fluid. The conditioning tube has a larger radial dimension than said object, so that the object can be introduced into said conditioning tube. The conditioning tube comprises at least one inner wall, said inner wall extending inwards from an inner surface of said conditioning tube, so that said inner wall extends towards an outer surface of an object introduced in said conditioning tube and ends in the immediate vicinity of said surface of said object.

In this embodiment, the inner wall of the conditioning tube acts as a fin for squeezing and accelerating the flow of conditioning fluid, e.g. a cooling fluid. For this reason, the inner wall is preferably a circumferential wall surrounding said outer surface of said object on the entire periphery. The inner wall may e.g. be formed by an annular washer arranged inside said conditioning tube, said washer having an outer diameter substantially equal to the inner diameter of said conditioning tube.

In order to prevent damages on the object when said inner wall comes into contact with the object, the inner wall is preferably formed of an elastic material, as e.g. rubber, neoprene or SBR. In this case, a misalignment between the conditioning tube and the object during insertion of the object into the tube is not likely to result in any surface damage. This is especially important when multiple tubes are moved over multiple objects, when e.g. up to 96 objects on the respective mold cores are enclosed simultaneously by a like number of tubes.

It has to be noted that the means for providing a flow of a conditioning fluid can be executed in various embodiments. In a first variant, this means comprises at least one conditioning fluid inlet associated with said conditioning tube for connecting said conditioning tube to a conditioning fluid supply and at least one conditioning fluid outlet, said inlet and said outlet being spaced in a longitudinal direction of said conditioning tube. The fluid inlet can e.g. be associated with a rearward end of the cooling tube wherein the fluid outlet is formed by the open forward end of the conditioning tube. Alternatively the fluid inlet can be associated with the forward end of said conditioning tube while the fluid outlet is arranged adjacent the rearward end.

In an alternative variant, said means for providing a flow of conditioning fluid comprises at least one suction means associated with said rearward end for aspirating air along said outer surface of said object. The suction means can e.g. comprise a vacuum pump connected to the rearward end of said conditioning tube. By applying a vacuum an the rearward end of the tube, ambient air is aspirated through the open forward end of the tube, which passes along the surface of the object inserted into the conditioning tube. Furthermore, the vacuum applied at the rearward end of the tube aspires the objet, so that the object is held in the cooling tube while the air cools the part's surface. It follows that such a cooling device can also be used as a carrying device for an object which is ejected of the molding core.

In a preferred embodiment of the device, the conditioning tube comprises a plurality of inner walls extending inwards from an inner surface of said conditioning tube, said inner walls being spaced in a direction of flow of a conditioning fluid, which flows between said conditioning fluid inlet and said conditioning fluid outlet. As stated above, an increase in the number of fins is beneficial to the overall heat exchange between the object and the conditioning fluid.

The arrangement of several inner walls inside the cooling tube provides a further advantage over standard prior art conditioning tubes. In fact, the different fins extending towards the surface of the object provide the cooling tube with a sort of "gun silencer" design. This results in a significantly reduced noise in operation of the conditioning tube. Furthermore, the fins cause a high pressure drop between the fluid inlet and the outlet. This means that the consumption of conditioning fluid, e.g. compressed air, is considerably reduced.

The arrangement of the inner walls may be such that said inner walls are regularly spaced. In this case, the heat exchange between the conditioning fluid and the object will be similar in the different zones of the object. Alternatively, said inner walls are irregularly spaced, so that specific regions of the object may be subject to a higher exchange than others. For instance, the space between two fins can be reduced in a region where the object has a greater material thickness. The increased conditioning effect in this region can then result in a more constant temperature over the entire length of the object.

It has to be noted, that the conditioning tube may be a straight tube or may have an inner form which corresponds substantially to the outer form of said object. In the first case, the radial dimension of the different lateral walls may be different depending on the form of the object so that the wide of the different passages between the fins and the surface of the object is substantially equal. In the second case, the radial dimension of the different fins can be substantially equal.

In a very simple embodiment of the invention, the inner walls are formed by annular washers, said washers being arranged inside said conditioning tube, said washers being spaced by means of tubular inserts. This embodiment provides a very high flexibility as to the specific arrangement of the fins. In fact, the use of tubular inserts having different lengths enables the washers to be spaced irregularly according to the specific needs with respect to the object to be conditioned. Furthermore, the assembly of the cooling tube is extremely simple and reversible.

In order to avoid surface damages of the object said inner walls may be formed of an elastic material, such as rubber neoprene or SBR. Provided that the elasticity is high, the washers may even have an inner diameter equal to or smaller than an outer diameter of said object. This means that the washers are in contact with the surface of the object when no conditioning fluid passes. Due to the elasticity of the washers, the flow of conditioning fluid can displace the inner edge of the washers from the surface of the object, so that the gap between the edge off the fin and the surface of the object, necessary for passing the fluid, is only created by the fluid itself.

In order to reduce the flexural strength of the washers, each washer may comprise at least one radial incision, said incision extending outwards from an inner border of said washer.

In an application of the invention on conventional molding machines, the device for cooling an object can be used for conditioning, e.g. cooling, an inner surface of a cavity of the object, after the object has been transferred into the tubes of a carrying plate. For this application, the device for temperature adjustment of an object preferably comprises a blowing tube connectable to a conditioning fluid supply and having an outlet for said conditioning fluid. The blowing tube is at least partially insertable into a cavity of said object for blowing a conditioning fluid into said cavity of said object, so that said conditioning fluid flows through said cavity from said outlet of said blowing tube towards an opening of said cavity. The blowing tube comprises at least one outwardly extending fin, said fin being arranged downstream of said outlet in a direction of flow of said conditioning fluid through said cavity. When said blowing tube is introduced into said cavity of said object, the fin extends towards a surface of said cavity of said object, so that said fin ends in the immediate vicinity of said surface of said object.

In this embodiment, the fin can again be formed by an annular washer, which can be fitted on an outer surface of said blowing tube. As with the device described above, further embodiments of this device are possible, wherein the fin is formed of an elastic material and wherein said blowing tube comprises a plurality of outwardly extending fins, said fins being spaced, regularly or irregularly, in a longitudinal direction of said blowing tube. Finally the fins may be formed by annular washers that are fitted on an outer surface of said blowing tube, said washers being spaced by means of tubular bushings.

It has to be noted, that the different devices described above can be combined in order provide an effective conditioning of both the outer and the inner surface of the object. This can be achieved in a device for temperature adjustment of an object, comprising a conditioning tube having an open forward end for receiving said object and a rearward end, and at least one suction means associated with said rearward end for aspirating air along an outer surface of an object inserted into said conditioning tube. The conditioning tube has a larger radial dimension than said object and comprises at least one inner wall, said inner wall extending inwards from an inner surface of said conditioning tube, so that said inner wall extends towards an outer surface of an object introduced in said conditioning tube and ends in the immediate vicinity of said surface of said object. The device further comprises a blowing tube connectable to a conditioning fluid supply and having an outlet for said conditioning fluid. The blowing tube is at least partially insertable into a cavity of said object for blowing a conditioning fluid into said cavity of said object, so that said conditioning fluid flows through said cavity from said outlet of said blowing tube towards an opening of said cavity. The blowing tube comprises at least one outwardly extending fin, said fin being arranged downstream of said outlet in a direction of flow of said conditioning fluid through said cavity. When said blowing tube is introduced into said cavity of said object, the fin extends towards a surface of said cavity of said object, so that said fin ends in the immediate vicinity of said surface of said object.

It will be apparent for the one skilled in the art, that the devices described above are suitable for use in different types of molding machines.

For instance in turret style injection machines, a conditioning mold arranged e.g. in a second or third position of the turret, can comprise a plurality of conditioning tubes as described above for cooling the outer surface of the molded objects. Furthermore, if the objects are ejected from the mold cores after insertion into the conditioning mold, such an injection machine may further comprise a plurality of blowing tubes which are arranged on a support in accordance with the arrangement of the mold cores for inserting said blowing tubes into a cavity of said objects. These blowing tubes are then inserted into the cavities of said objects for cooling the inner surface of the objects.

Conventional injection machines, in which a carrying plate with receiving cavities is positioned between the opened mold parts and the molded objects are transferred into the receiving cavities of said carrying plate, can comprise a conditioning device comprising a plurality of blowing tubes. These blowing tubes are then arranged on a support in accordance with the arrangement of the mold cores for inserting into a cavity of said objects. Furthermore, each receiving cavity may comprise a conditioning tube for cooling the outer surface of the object.

BRIEF DESCRIPTION OF THE DRAWINGS

The present invention will be more apparent from the following description of several not limiting embodiments with reference to the attached drawings, wherein.

DETAILED DESCRIPTION OF THE PREFERRED EMBODIMENTS

Figure 1:
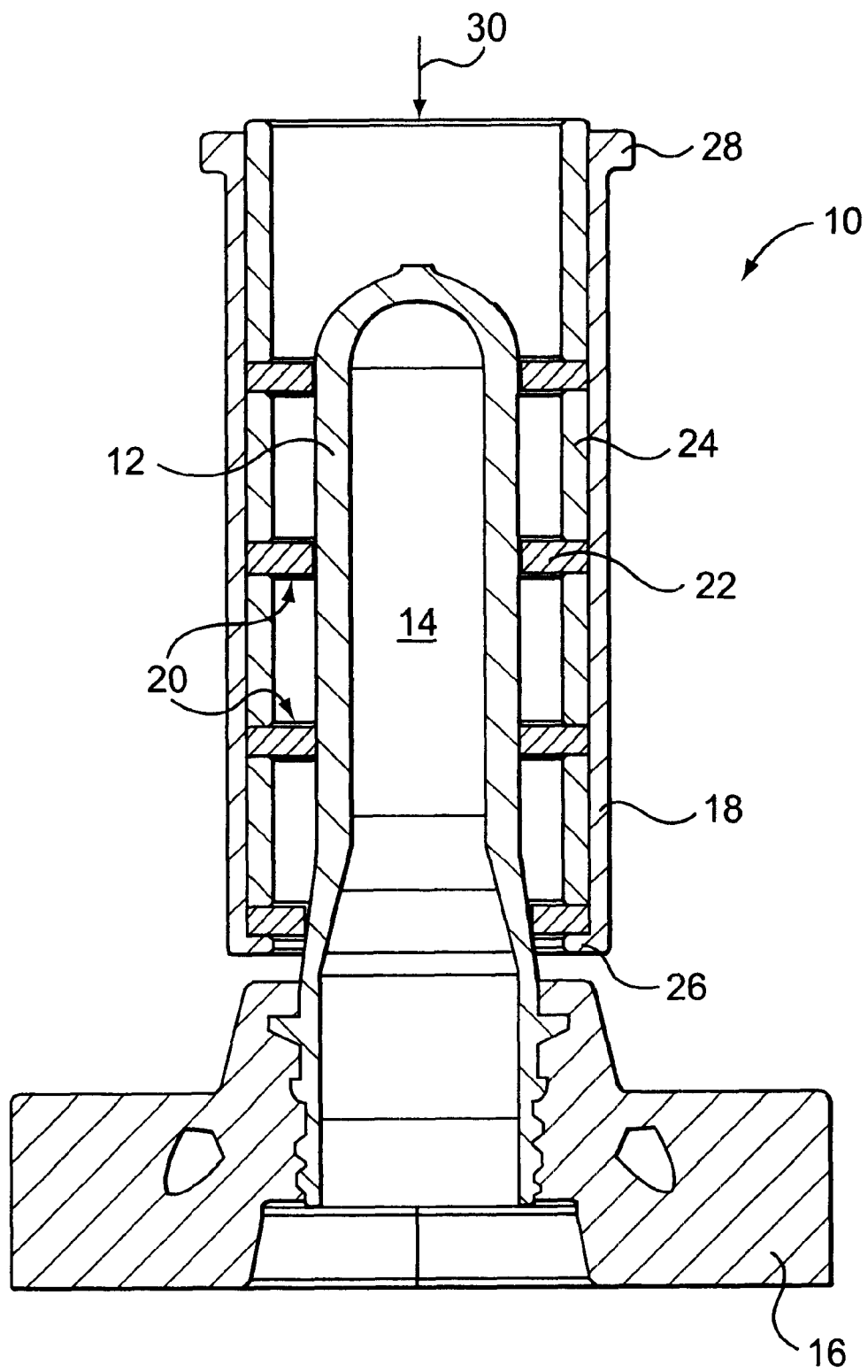
FIG. 1: shows an embodiment of a device for cooling a preform on a mold core for use in a turret style molding machine.

FIG. 1 shows an embodiment of a device 10 for cooling an object, which is specifically adapted for cooling a molded object on a mold core. In an application on a turret style molding machine, a plurality of these devices are arranged in a conditioning mold, the number of the devices being equal to the number of the cores of the mold half and the positioning being in accordance with the arrangement of the cores.

The object shown in FIG. 1 is a preform 12 for blow molding a plastic bottle. During the molding process, the preform 12 is molded on one of the mold cores 14 of a first mold half 16, which is introduced in a mold cavity of a second mold half (not shown). After some cooling in the water-cooled second mold half, the first mold half is removed from the second mold half and rotated in a conditioning position of the turret. In this conditioning position, further cooling has to be performed in order to reduce the temperature of the preform to a value below its crystallization temperature. The preform is therefore introduced in a cooling device 10 for blowing a cooling fluid, e.g. compressed air, onto the outer surface of the preform.

The device 10 comprises a cooling tube 18, the inner dimension of which is larger than the outer dimension of the preform 12. The cooling tube comprises several inner walls 20, which extend inwards from an inner surface of the tube 18. In the embodiment shown, the inner walls 20 extend radially inwards and end in the immediate vicinity of the outer surface of the object, so that a small gap is formed between the inner wall 20 and the surface of the preform.

The inner walls can e.g. comprise annular washers 22 of a flexible material, which are arranged inside the cooling tube 18 by means of tubular inserts 24. This arrangement provides a very high flexibility with respect to the spacing of the inner walls 20. In fact, by using tubular inserts of different lengths, the distance between two inner walls 20 is easily adjustable.

Furthermore, the assembly of the cooling tube is very easy. At its lower end, the cooling tube preferably comprises an inwardly extending stop 26. The first washer can thus be inserted from above into the tube until it abuts against this stop 26. After inserting a first insert, the next washer can be inserted and so on. Alternatively, the first piece to be inserted into the tube is an insert, which will then abut against the stop 26.

As shown in FIG. 1, the arrangement of the washers and the inserts is such, that the overall length of the inserted parts is slightly higher than the length of the tube. When the tube 18 is connected to a cooling fluid supply e.g. by means of an upper outwardly extending flange 28, the washers will be compressed and accordingly will be safely fitted between the inserts 24.

During operation, compressed air is supplied to the cooling tube 18 (indicated by arrow 30), which will flow along the surface of the preform. Due to the reduction of the area of the flow path in the region of the inner walls, the cooling fluid squeezes between the inner walls 20 and the surface of the preform and accordingly it speeds up. After passing between the inner wall 20 and the surface of the preform, the cooling fluid enters the turbulence chamber formed between to of the inner walls, where it expands and accordingly slows down. It follows that the flow of cooling fluid is highly turbulent along the surface of the preform, so that the heat exchange between the cooling fluid and the preform is very high.

Figure 3:
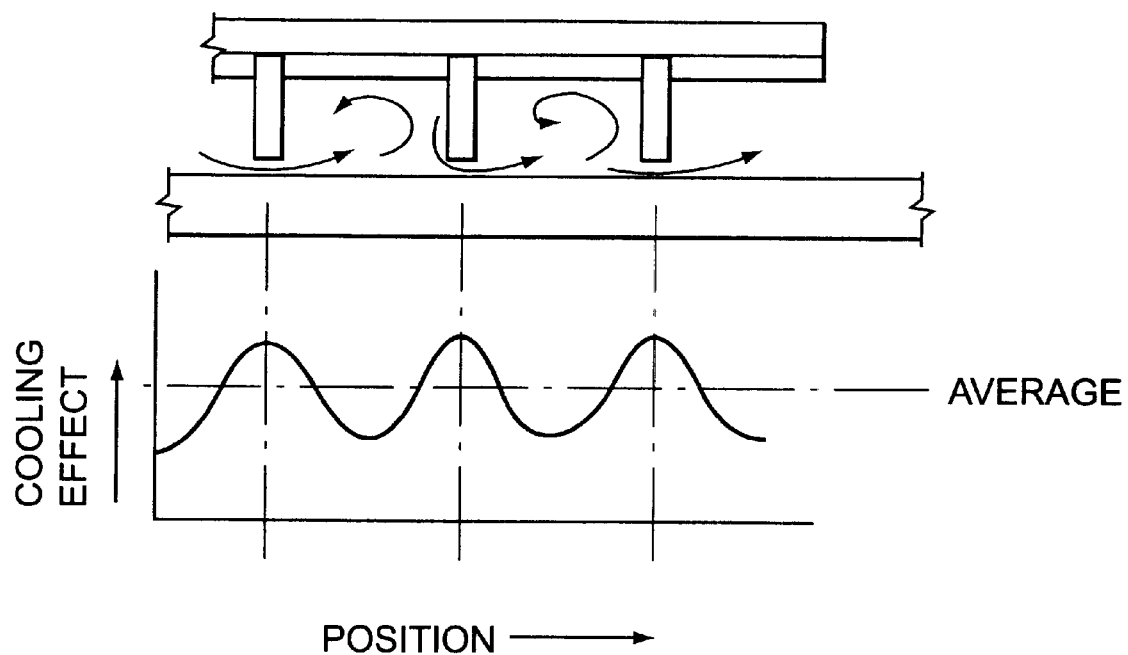
FIG. 3 and FIG. 4: show the effect of the arrangement of the fins on the cooling result.
Figure 4:
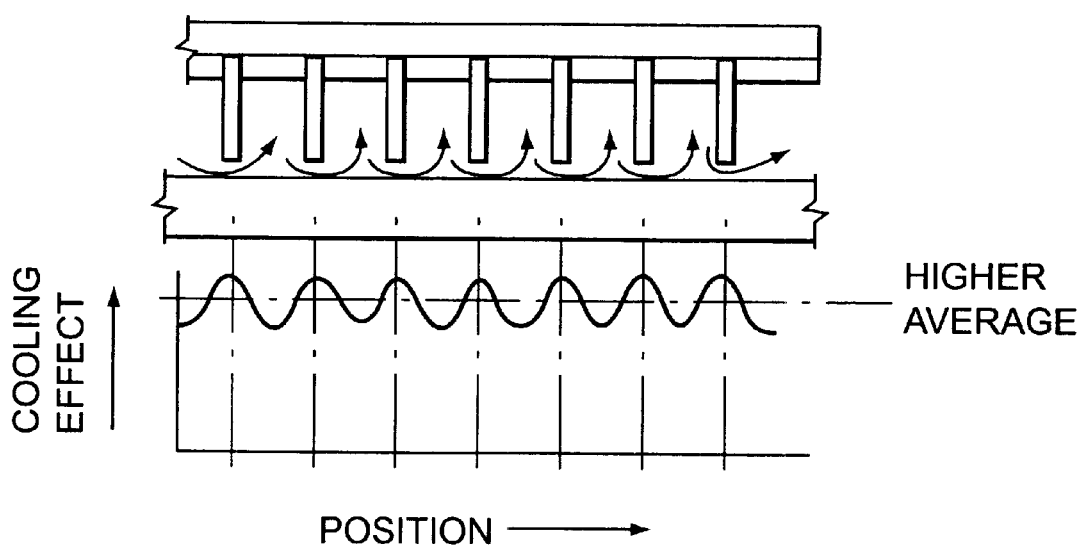

By varying the number of inner walls 20 and adapting the space between two walls within certain limits, this heat exchange can be further increased so that the average cooling effect is increased. This principle is shown in FIG. 3 and 4. Both figures show the variation of the cooling effect over the length of the preform, i.e. a representation of the cooling effect vs. position on the preform. While FIG. 3 represents the situation with a reduced number of walls arranged at high distance, FIG. 4 shows the situation in an embodiment having an increased number of walls, which are arranged close together.

Figure 2:
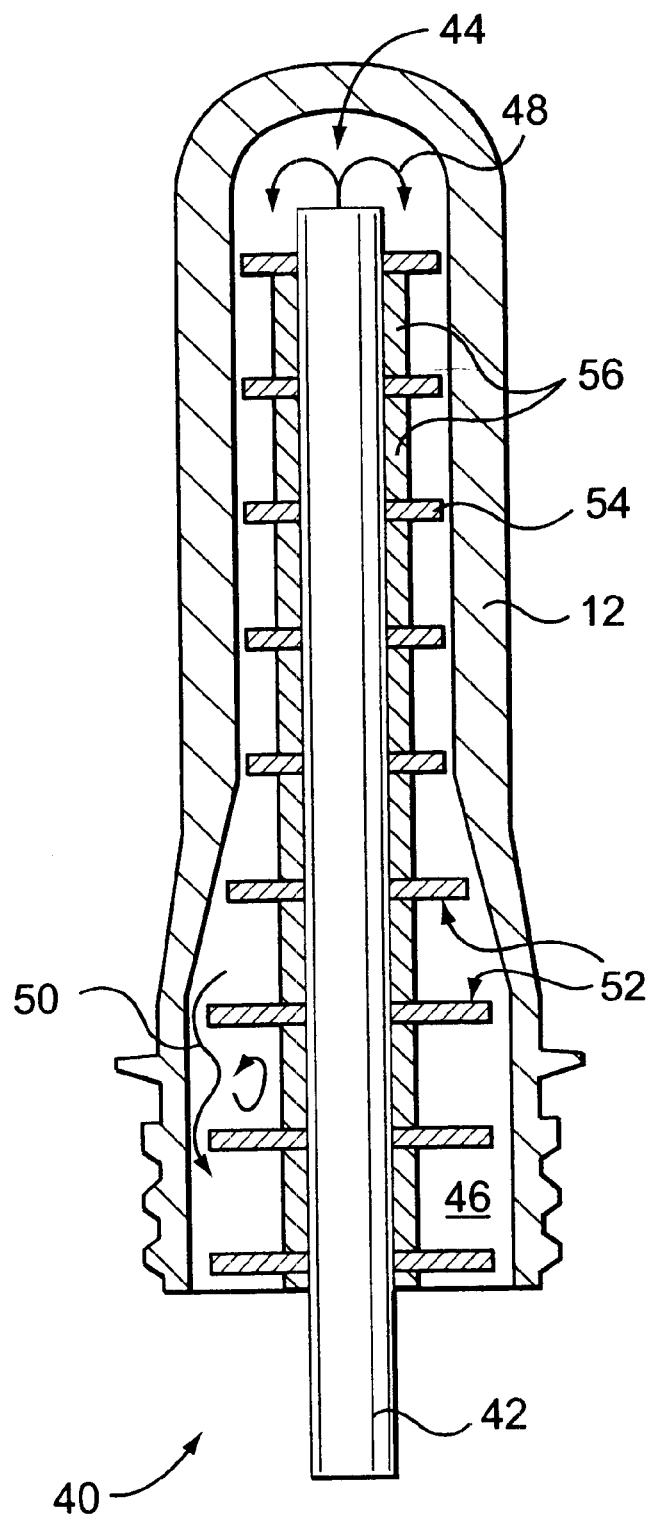
FIG. 2: shows an embodiment of a device for cooling a preform in a carrying plate on conventional molding machines.

An embodiment of a device for cooling a preform in a carrying plate on conventional molding machines is shown in FIG. 2. This device 40 is suitable for cooling an inner surface of a cavity of the preform 12.

It generally comprises a blowing tube 42, which can be connected at its lower end to a cooling fluid supply. At its upper end, the blowing tube comprises an outlet 44 for a cooling fluid supplied by the cooling fluid supply. In operation, the blowing tube 42 is at least partially inserted into a cavity 46 of the preform for blowing the fluid into the cavity 46 of the preform 12. The cooling fluid then flows from the outlet 44 arranged at the inner end of the cavity 46 along the inner surface of the cavity towards the opening of the preform (indicated by arrows 48 and 50).

The blowing tube 42 comprises a plurality of outwardly extending fins 52, which are arranged downstream of said outlet on the outer surface of the blowing tube 42. The fins 52 extend towards a surface of said cavity and end in the immediate vicinity of said surface.

Each fin 52 is preferably formed by an annular washer 54 fitted on an outer surface of said blowing tube. In the shown embodiment, the washers 54 are spaced by means of tubular bushings 56. As described above, the washers may be spaced irregularly by means of bushings having different lengths.

As can further be seen on FIG. 2, the annular washers in the lower part of the preform have a larger outer diameter than the washers in the upper part of the cavity for compensation a difference in the diameter of the cavity 46.

It has to be noted that the principle explained with respect to FIGS. 3 and 4 also applies for the device for cooling of FIG. 2.

What is claimed is:

1. Device for temperature adjustment of an object, comprising:
    means for providing a flow of a conditioning fluid, said flow of conditioning fluid being directed along a surface of said object; and
    at least one fin directed towards said surface of said object;
    wherein said at least one fin is arranged in the immediate vicinity of said surface of said object so that an edge of said fin extends substantially normally with respect to said flow of said conditioning fluid, said conditioning fluid passing between said surface of said object and said edge of said fin.

2. Device according to claim 1, wherein said at least one fin is arranged substantially normal to said surface of said object.

3. Device according to claim 1, wherein said fin is inclined with respect to a normal of said surface of said object.

4. Device according to claim 1, wherein said edge of said at least one fin abuts against said surface of said object if no conditioning fluid passes between said surface of said object and said edge of said fin.

5. Device for temperature adjustment of an object, comprising:
means for providing a flow of a conditioning fluid, said flow of conditioning fluid being directed along a surface of said object; and
a plurality of fins arranged one behind the other in the direction of said flow of said conditioning fluid, said fins being directed towards said surface of said object;
wherein said fins are arranged in the immediate vicinity of said surface of said object so that an edge of said fins extends substantially normally with respect to said flow of said conditioning fluid, said conditioning fluid passing between said surface of said object and said edges of said fins.

6. Method for temperature adjustment of an object, comprising the steps of:
arranging at least one fin in the immediate vicinity of a surface of said object, said fin being directed towards said surface,
providing a flow of a conditioning fluid along said surface of said object, said flow of conditioning fluid being directed substantially normally with respect of an edge of said fin, and
passing said flow of conditioning fluid between said surface of said object and said edge of said fin.

7. Method according to claim 6, wherein a plurality of fins are arranged one behind the other in the direction of said flow of said conditioning fluid.

8. Device for temperature adjustment of an object, comprising a conditioning tube and an associated means for providing a flow of a conditioning fluid, said conditioning tube having a larger radial dimension than said object, wherein said conditioning tube comprises at least one inner wall, said inner wall extending inwards from an inner surface of said conditioning tube, so that said inner wall extends towards an outer surface of an object introduced in said conditioning tube and ends in the immediate vicinity of said surface of said object.

9. Device according to claim 8, wherein said inner wall is a circumferential wall surrounding said outer surface of said object on the entire periphery.

10. Device according to claim 8, wherein said inner wall is formed by an annular washer arranged inside said conditioning tube, said washer having an outer diameter substantially equal to the inner diameter of said conditioning tube.

11. Device according to claim 8, wherein said inner wall is formed of an elastic material.

12. Device according to claim 8, wherein said means for providing a flow of conditioning fluid comprises at least one conditioning fluid inlet associated with said conditioning tube for connecting said conditioning tube to a conditioning fluid supply and at least one conditioning fluid outlet, said inlet and said outlet being spaced in a longitudinal direction of said conditioning tube.

13. Device according to claim 8, wherein said conditioning tube has an open forward end for receiving said object and a rearward end, and wherein said means for providing a flow of conditioning fluid comprises at least one suction means associated with said rearward end for aspirating air along said outer surface of said object.

14. Device according to claim 8, wherein said conditioning tube comprises a plurality of inner walls extending inwards from an inner surface of said conditioning tube, said inner walls being spaced in a direction of flow of a conditioning fluid, which flows between said conditioning fluid inlet and said conditioning fluid outlet.

15. Device according to claim 14, wherein said inner walls are regularly spaced.

16. Device according to claim 14, wherein said inner walls are irregularly spaced.

17. Device according to claim 14, wherein said inner walls are formed by annular washers, said washers being arranged inside said conditioning tube, said washers being spaced by means of tubular inserts.

18. Device according to claim 14, wherein said inner walls are formed of an elastic material.

19. Device according to claim 17, wherein said washers are formed of an elastic material and wherein said washers have an inner diameter equal to or smaller than an outer diameter of said object.

20. Device according to claim 19, wherein each washer comprises at least one radial incision, said incision extending outwards from an inner border of said washer.

21. Device according to claim 8, wherein said conditioning fluid is a cooling fluid.

22. Device for temperature adjustment of an object, comprising a blowing tube connectable to a conditioning fluid supply and having an outlet for said conditioning fluid, said blowing tube being at least partially insertable into a cavity of said object for blowing a conditioning fluid into said cavity of said object, said conditioning fluid flowing through said cavity from said outlet of said blowing tube towards an opening of said cavity, wherein said blowing tube comprises at least one outwardly extending fin, said fin being arranged downstream of said outlet in a direction of flow of said conditioning fluid through said cavity, said fin extending towards a surface of said cavity of said object when said blowing tube is introduced into said cavity of said object, so that said fin ends in the immediate vicinity of said surface of said object.

23. Device according to claim 22, wherein said fin is formed by an annular washer fitted on an outer surface of said blowing tube.

24. Device according to claim 22, wherein said fin is formed of an elastic material.

25. Device according to claim 22, wherein said blowing tube comprises a plurality of outwardly extending fins, said fins being spaced in a longitudinal direction of said blowing tube.

26. Device according to claim 25, wherein said fins are regularly spaced.

27. Device according to claim 25, wherein said fins are irregularly spaced.

28. Device according to claim 25, wherein said fins are formed by annular washers, said washers being fitted on an outer surface of said blowing tube, said washers being spaced by means of tubular bushings.

29. Device according to claim 25, wherein said fins are formed of an elastic material.

30. Device according to claim 22, wherein said conditioning fluid is a cooling fluid.

31. Device for temperature adjustment of an object, comprising a conditioning tube having an open forward end for receiving said object and a rearward end, and at least one suction means associated with said rearward end for aspirating air along an outer surface of an object inserted into said conditioning tube, said conditioning tube having a larger radial dimension than said object and comprising at least one inner wall, said inner wall extending inwards from an inner surface of said conditioning tube, so that said inner wall extends towards an outer surface of an object introduced in said conditioning tube and ends in the immediate vicinity of said surface of said object, said device further comprising a blowing tube connectable to a conditioning fluid supply and having an outlet for said conditioning fluid, said blowing tube being at least partially insertable into a cavity of said object for blowing a conditioning fluid into said cavity of said object, said conditioning fluid flowing through said cavity from said outlet of said blowing tube towards an opening of said cavity, wherein said blowing tube comprises at least one outwardly extending fin, said fin being arranged downstream of said outlet in a direction of flow of said conditioning fluid through said cavity, said fin extending towards a surface of said cavity of said object when said blowing tube is introduced into said cavity of said object, so that said fin ends in the immediate vicinity of said surface of said object.

32. Injection molding machine, comprising a first mold half with a plurality of mold cavities, at least one second mold half with a plurality of mold cores, the number of said mold cores being equal or less to the number of said mold cavities and the arrangement of said mold cores being in accordance with the arrangement of said mold cavities, said second mold half being movable between a molding position, in which said mold cores are in alignment with said mold cavities for molding an object on each of said mold cores, and a conditioning position, in which objects formed on said mold cores are subject to a temperature conditioning, and a temperature conditioning mold arranged for receiving said objects molded on said mold cores when said second mold half is moved in its conditioning position, wherein said temperature conditioning mold comprises a plurality of devices for temperature adjustment of an object according to any one of claims 8 to 21.

33. Injection molding machine according to claim 32, wherein said objects are ejected from said mold cores when said objects are introduced into said temperature conditioning mold, said machine further comprising a plurality of devices for temperature adjustments for an object, each said device for temperature adjustment comprising a blowing tube connectable to a conditioning fluid supply and having an outlet for said conditioning fluid, said blowing tube being at least partially insertable into a cavity of said object for blowing a conditioning fluid into said cavity of said object, said conditioning fluid flowing through said cavity from said outlet of said blowing tube towards an opening of said cavity, wherein said blowing tube comprises at least one outwardly extending fin, said fin being arranged downstream of said outlet in a direction of flow of said conditioning fluid through said cavity, said fin extending towards a surface of said cavity of said object when said blowing tube is introduced into said cavity at said object, so that said fin ends in the immediate vicinity of said surface of said object, said devices for temperature adjustment being arranged on a support in accordance with the arrangement of the mold cores for inserting said devices into a cavity of said objects.

34. Injection molding machine, comprising
    a first mold half with a plurality of mold cavities, a second mold half with a plurality of mold cores, the number of said mold cores being equal or less to the number of said mold cavities and the arrangement of said mold cores being in accordance with the arrangement of said mold cavities, said second mold half being movable between a closed position, in which said mold cores are inserted in said mold cavities for molding an object on each of said mold cores, and an open position, in which said mold cores are separated from said mold cavities,
    a carrier plate means, said carrier plate means having a plurality of receiving cavities arranged therein in accordance with the arrangement of said mold cores, said carrier plate means being movable between said first and said second mold half if said second mold half is in the open position, so that said receiving cavities are in alignment with molded objects on said mold cores for transferring said objects from said mold cores into said receiving cavities, and
    a conditioning device, said conditioning device comprising a plurality of devices for temperature adjustment of an object according to claim 22, said devices for temperature adjustment being arranged on a support in accordance with the arrangement of the mold cores for inserting said devices into a cavity of said objects.

35. Injection molding machine according to claim 34, wherein each receiving cavity comprises a device for temperature adjustment of an object, each said device for temperature adjustment comprising a conditioning tube and an associated means for providing a flow of a conditioning fluid, said conditioning tube having a larger radial dimension than said object, wherein said conditioning tube comprises at least one inner wall, said inner wall extending inwards from an inner surface of said conditioning tube, so that said inner wall extends towards an outer surface of an object introduced in said conditioning tube and ends in the immediate vicinity of said surface of said object.

* * * * *